United States Patent [19]

Wei

[11] 4,294,945
[45] Oct. 13, 1981

[54] REDUCTION OF SCALE FORMATION DURING VINYL CHLORIDE POLYMERIZATION WITH TIN MERCAPTIDES

[75] Inventor: Chung H. Wei, Bolton, Mass.

[73] Assignee: Stauffer Chemical Company, Westport, Conn.

[21] Appl. No.: 142,294

[22] Filed: Apr. 21, 1980

[51] Int. Cl.³ ............................ C08F 2/44; C08F 2/38; C08F 2/18
[52] U.S. Cl. ............................... 526/74; 260/45.75 S; 526/190; 526/200; 526/213
[58] Field of Search .................................. 526/74, 190

[56] References Cited

U.S. PATENT DOCUMENTS

| | | | |
|---|---|---|---|
| 2,575,135 | 11/1951 | Schulze | 526/192 |
| 3,669,946 | 6/1972 | Koyanagi | 526/62 |
| 3,862,066 | 1/1975 | Reiter | 260/23 XA |
| 3,962,202 | 6/1976 | Morningstar | 516/74 |

OTHER PUBLICATIONS

Chem. Abst., 66, 56110r, (1967).

*Primary Examiner*—C. A. Henderson
*Attorney, Agent, or Firm*—Richard P. Fennelly

[57] ABSTRACT

Vinyl chloride monomer is suspension polymerized in an aqueous suspension polymerization medium in the presence of an effective amount of an organotin mercaptide and an expoxidized vegetable oil to lessen the amount of polymer scale formation from the reaction.

10 Claims, No Drawings

REDUCTION OF SCALE FORMATION DURING VINYL CHLORIDE POLYMERIZATION WITH TIN MERCAPTIDES

BACKGROUND OF THE INVENTION

1. Field of the Invention

The present invention relates to an improved process for the manufacture of vinyl chloride polymer by means of suspension polymerization.

2. Description of the Prior Art

Various efforts have been made in recent years to reduce the amount of undesired polymer scale formation inside the reactor during the manufacture of vinyl chloride polymer. The formation of such polymer scale, for example, necessitates cleaning of the reactor during batch polymerization operations and is undesirable due to reactor downtime, labor time, and costs in accomplishing the cleaning operation.

Organotin mercaptides have been suggested for use as additives during the polymerization of vinyl chloride monomer in the past without any realization that such compounds, when used in conjunction with an epoxidized vegetable oil, can be used to reduce the amount of polymer scale formation during the suspension polymerization of vinyl chloride monomer, optionally in the presence of one or more copolymerizable monomer(s). For example, in U.S. Pat. No. 2,575,135 to W. A. Schulze et al., the use of mercaptides as modifying agents during emulsion polymerization reactions is proposed to give gel-free polymers of high molecular weight, of uniform characteristics, and of good processability. Additionally, in U.S. Pat. No. 3,862,066 to W. M. Reiter et al. and in "Participation of Sulfur Compounds in Vinyl and Related Polymerization" by P. Ghosh, pp. 195–227, it is suggested that mercaptides depress the polymerization rate and can be added to the polymerization batch near the intended termination point of the reaction to merely act as a short-stopping agent.

SUMMARY OF THE INVENTION

The present invention is an improved process for the suspension polymerization of vinyl chloride monomer which comprises the incorporation of an effective amount of an organotin mercaptide and an epoxidized vegetable oil in the polymerization reaction medium to decrease the amount of polymer scale formation in the reactor. The mercaptide and epoxidized vegetable oil additives are present during a substantial portion of the reaction in order to accomplish such a result and do not appreciably alter the characteristics of the product by their presence.

DESCRIPTION OF PREFERRED EMBODIMENTS OF THE INVENTION

The present invention comprises the polymerization of vinyl chloride monomer (optionally in the presence of one or more copolymerizable monomers) in an aqueous reaction medium also comprising a suitable suspending agent, an initiator, and the organotin mercaptide and epoxidized vegetable oil additives of the present invention.

The monomers which are suitable for inclusion in the aqueous reaction medium which is subjected to polymerization comprise vinyl chloride and its copolymerizable comonomers. Some representative comonomers include: vinyl esters, such as vinyl acetate, vinyl propionate, vinyl laurate, and vinyl stearate; unsaturated acids, such as acrylic acid, methacrylic acid, and itaconic acid, and esters thereof; vinyl ethers such as methyl vinyl ether, ethyl vinyl ether, octyl vinyl ether, and lauryl vinyl ether; and maleic acid, fumaric acid, and the anhydrides or esters thereof.

Preferably, the comonomers are used in a quantity no greater than 50%, by weight of the total monomer charge. The monomer charge will generally constitute from about 25% to about 45%, by weight of the aqueous reaction mixture.

The suspending agent which is used in the present process can be any of the conventional suspending agents suitable for use in the suspension polymerization of vinyl chloride monomers. It is present in an amount which is effective to suspend or disperse the monomer, generally from about 0.05% to about 1.5%, by weight of the monomer. Some representative suspending agents for use in the present invention include: the cellulose ethers, such as methyl cellulose, hydroxyethyl cellulose, hydroxypropyl cellulose, hydroxyethyl cellulose; such compounds as polyvinyl alcohol, gelatin, agar-agar, starch, the partially hydrolyzed polyvinyl acetates, and copolymerization products of vinyl acetate and maleic anhydride or maleic acid. Compatible mixtures of any of the foregoing may be used.

The initiator is a monomer (or oil) soluble initiator of the type normally employed in the suspension polymerization of vinyl chloride and is present in an amount which is effective to initiate and sustain the polymerization of the monomer or monomers. Generally, this will be in the range of from about 0.03% to about 0.50%, by weight of the monomer. For the greatest degree of reactor cleanliness a hydrophobic monomer soluble initiator should be selected. Representative initiators include the longer alkyl chain peroxydicarbonates (e.g., bis(2-ethylhexyl)peroxydicarbonate, a preferred initiator) and the alkyl peroxyester initiators (e.g., t-butyl peroxyneodecanoate). Compatible combinations of more than one of these initiators may be used, if desired.

In addition to the foregoing conventional types of monomer, initiator and suspending agent, the reaction medium may also contain one or more conventional buffer, chain transfer agent, or other additive normally used in the suspension polymerization of vinyl chloride in conventional minor amount to give the particular desired result.

The present invention is directed to the use of an effective amount of an organotin mercaptide and an epoxidized vegetable oil in the aforementioned suspension polymerization reaction medium to reduce the amount of undesired polymer scale formation. The mercaptide and vegetable oil additives can be present in the reaction medium by either being added to the reaction vessel with the reactants or by being coated on the inner surfaces of the reactor prior to addition of the other constituents of the reaction.

Representative mercaptide compounds which are suitable for use in the process of the present invention can be represented by the formula:

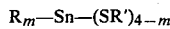

where m is an integer of from 1 to 3, $R_m$ is a hydrocarbon group, such as alkyl, aryl, alkaryl, or aralkyl, and R' is the same as $R_m$ or is —C(O)$R_m$. Preferred $R_m$ groups include the hydrocarbon groups having from 1 to 10 carbon atoms. Some preferred compounds include dioctyl tin mercaptoacetate and dimethyl tin mercaptide. The amount of organotin mercaptide that is used in the present invention will generally be from about 0.01% to about 0.5%, by weight of the monomer or monomers to be polymerized, preferably from about 0.05% to about 0.25%.

The epoxidized vegetable oil additive which is used in the present invention is selected from those epoxidized vegetable oil compounds which have been conventionally employed heretofore as plasticizers for vinyl chloride polymers and other polymers. Epoxidized soybean oil is preferred because of its availability. Other epoxidized vegetable oils which can be used are the epoxidized derivatives of: linseed oil, safflower oil, corn oil, cottonseed oil, rape seed oil, and peanut oil. This additive is believed to promote adhesion of the mercaptide additive to the interior surfaces of the reactor and thereby retard polymer plate-out on such surfaces. The amount of epoxidized vegetable oil which is used in the present invention can range from about 0.01% to about 0.50%, by weight of the monomer or monomers to be polymerized, preferably from about 0.05% to about 0.25%, by weight.

In order to assist in diluting the blend of mercaptide and oil so that it is thinner and more amenable to being used to coat the interior of the reactor, it can optionally be mixed with an inert organic solvent, such as mineral spirits. Generally, a weight ratio of from about 1:1 to about 4:1 of the solvent to the mixture of mercaptide and epoxidized vegetable oil can be used.

After the monomer, suspending agent, initiator, and any other reaction ingredients are homogeneously dispersed in the aqueous reaction mixture by means of suitable agitation, the mixture is then subjected to polymerization conditions involving the application of sufficient heat and agitation for a sufficient length of time to produce the desired endproduct. The additional presence of the organotin mercaptide/epoxidized vegetable oil combination, optionally in the presence of an inert organic solvent, aids in reducing the amount of polymer scale formation on the interior surfaces of the reactor. Those temperature and agitation conditions that are used in conventional suspension polymerization reactions may be employed. Generally, polymerization temperatures of from 40° C. to about 80° C. can be employed with polymerization times of from about 3 to about 12 hours.

The present invention is further illustrated by the Examples which follow.

(COMPARATIVE) EXAMPLE 1

This Example illustrates the results that were obtained when vinyl chloride monomer was suspension polymerized without the use of the present invention. In this Example no mercaptide or epoxidized vegetable oil additive was used.

To a suitable reactor was added, with agitation, 20.87 kg. of deionized water, 3.63 kg. of a hydroxypropyl methyl cellulose suspending agent solution (METHOCEL K-35 brand from Dow Chemical Company, a mixture of 3 gm. of the cellulose powder in 0.45 kg. of deionized water), and 10 gm. of bis(2-ethylhexyl)peroxydicarbonate initiator. The reactor atmosphere was purged three times with vinyl chloride monomer, and then 9.98 kg. of vinyl chloride monomer was added. The reactor was brought to 57.2° C. to initiate the reaction. When the pressure in the reactor dropped about 2.81 kg/cm$^2$, the reaction was judged complete, the reactor atmosphere was vented to suitable recovery equipment, and the product was recovered.

The above polymerization was repeated with a brief water rinsing (20 minutes) of the interior of the reactor after each batch. After two polymerization runs, a light to medium buildup of polymer scale was noted on the interior of the reactor surfaces. This buildup gradually increased after each run until a very high buildup was noted after the eighth run, requiring cleaning.

EXAMPLE 2

This Example illustrates the superior results, as compared to Example 1, that are obtained in reactor cleanliness with use of a dialkyl tin mercaptide and epoxidized vegetable oil additive combination in the suspension polymerization of vinyl chloride in accordance with the present invention.

To a suitable reactor was added at room temperature, with agitation, 20.87 kg. of deionized water, 3.63 kg. of a hydroxypropyl methyl cellulose suspending agent solution (METHOCEL K-35 brand from Dow Chemical Company, a 0.66% by weight solution in water), and 35 gm. of a solution of various petroleum distillate solvents (20 gm.), epoxidized soybean oil (5 gm.) and a dialkyl tin mercaptide, believed to be dioctyl tin mercaptoacetate, available as THERMOLITE 108 brand from M and T Chemicals (10 gm.). To the resulting mixture was then added 15 gm. of bis(2-ethylhexyl)-peroxydicarbonate. The resulting mixture was thoroughly mixed. At this point the reactor atmosphere was purged three times with vinyl chloride monomer, and 9.98 kg. of vinyl chloride monomer reactant was added. The reaction was initiated by heating the mixture to 57.2° C.

When the pressure of reaction dropped about 2.81 kg/cm$^2$, a mixture of 10 gm. of a silicone defoamer (HERCULES 831 brand), 1 gm. of alpha methyl styrene, and 50 ml. of deionized water was added to short stop the reaction. The reaction mixture was cooled, and the reactor was vented. The product was then recovered.

This procedure was repeated with the interior of the reactor being flushed with deionized water for about 20 minutes after each batch reaction. A total of fifty batches were run before the polymer buildup became heavy enough (as found in Example 1) to necessitate reactor cleaning.

EXAMPLE 3

This Example represents another embodiment of the present invention generally similar to the procedure in Example 2 with the exception that the mercaptide and epoxidized vegetable oil additive mixture was also sprayed onto the reactor surface prior to charging the reactor with the reactants.

The inside of the reactor was sprayed with a mixture of 55 parts by weight of a mixture of mineral spirits solvent (40 parts by weight), a dialkyl tin mercaptide (THERMOLITE 108 brand) (10 parts by weight), and epoxidized soybean oil (5 parts by weight) prior to charging of the reactor. Then the reactor was charged with 20.87 kg. of deionized water followed by 3.63 kg. of the hydroxypropyl methyl cellulose suspending agent solution used in Example 2, 9.98 kg. of vinyl chloride monomer, 15 gm. of bis(2-ethylhexyl)peroxydicarbonate, 10 gm. of the dialkyl tin mercaptide (THERMOLITE 108 brand), 5 gm. of epoxidized soybean oil, and 20 gm. of mineral spirits. The mixture was then heated to 57.2° C. to initiate the polymerization reaction. When the pressure inside the reactor dropped about 2.81 kg/cm², a solution of silicone defoamer (10 gm.), alpha methyl styrene (1 gm.) and deionized water (50 ml.) was added to short stop the reaction. The reactor was vented, and the reaction mixture steam stripped at 85° C. The mixture was then cooled, and the product recovered.

The above-described reaction was repeated after the reactor had been subjected to a water rinsing for 20 minutes after each batch. A total of twenty-two runs were conducted with only a slight polymer haze buildup on the reactor surfaces being noted. This appeared to be somewhat superior to Example 2 where a blistered skin buildup was noted after twenty-two runs on the reactor and agitator and a light skin buildup on the reactor baffles.

EXAMPLE 4

This Example illustrates the practice of the present invention utilizing a differing dialkyl tin mercaptide additive from the one used in Example Nos. 2 and 3.

The following ingredients were heated at about 58.9° C. in a 26.5 liter reactor at 260 rpm:

| Ingredient | Amount |
| --- | --- |
| Water (deionized) | 13.61 kg. |
| Vinyl chloride monomer | 9.07 kg. |
| T-butyl perneodecanoate initiator in mineral spirits (ESPEROX 33M brand) | 8 gm. |
| Hydroxypropyl methyl cellulose suspending agent (METHOCEL F-50 brand) | 10 gm. |
| Methyl tin mercaptide (MARK 1928 brand) | 10 gm. |
| Epoxidized soybean oil (DRAPEX 6.8 brand) | 5 gm. |

The deionized water was charged into the reactor first, with agitation, followed by the suspending agent which had previously been dissolved in part of the water. Then a mixture of the mercaptide and soybean oil was added. The initiator was then charged into the reactor, the reactor was sealed, and vacuum was applied to remove most of the air from the reactor. Vinyl chloride monomer was then added, and the entire reaction mixture was brought to the desired reaction temperature.

The above-described reaction was conducted in batch fashion for twenty-three runs before the reactor needed to be cleaned. A control series of polymerizations, not containing the mercaptide and soybean oil additives, would normally need to be cleaned after seven or eight successive polymerization reactions.

EXAMPLE 5

This Example is similar to Example 4 and illustrates another embodiment of the present invention.

The following ingredients were heated at about 57.8° C. in a 26.5 liter reactor at 260 rpm:

| Ingredient | Amount |
| --- | --- |
| Water (deionized) | 13.61 kg. |
| Vinyl chloride monomer | 9.07 kg. |
| T-butyl perneodecanoate initiator in mineral spirits (ESPEROX 33M brand) | 9 gm. |
| Hydroxypropyl methyl cellulose suspending agent (METHOCEL F-50 brand) | 12 gm. |
| Methyl tin mercaptide (MARK 1928 brand) | 12.5 gm. |
| Epoxidized soybean oil (DRAPEX 6.8 brand) | 6.25 gm. |

The above-described reaction was conducted in batch fashion fifteen times before the reactor needed to be cleaned. A control series of polymerizations, not containing the mercaptide and soybean oil additives, would normally need to be cleaned after seven or eight successive polymerization reactions.

EXAMPLE 6

This Example is similar to Example 4 and illustrates another embodiment of the present invention.

The following ingredients were heated at about 58.9° C. in a 26.5 liter reactor at 260 rpm:

| Ingredient | Amount |
| --- | --- |
| Water (deionized) | 13.61 kg. |
| Vinyl chloride monomer | 9.07 kg. |
| T-butyl perneodecanoate initiator in mineral spirits (ESPEROX 33M brand) | 8 gm. |
| Hydroxypropyl methyl cellulose suspending agent (METHOCEL F-50 brand) | 10 gm. |
| Methyl tin mercaptide (MARK 1928 brand) | 30 gm. |
| Epoxidized soybean oil (DRAPEX 6.8 brand) | 15 gm. |

The above-described reaction was conducted in batch fashion fifteen times before the reactor needed to be cleaned. A control series of polymerizations, not containing the mercaptide and soybean oil additives, would normally need to be cleaned after seven or eight successive polymerization reactions.

EXAMPLE 7

This Example illustrates an actual commercial production run using the present invention.

Deionized water (8705.5 liters) was charged into the reactor, and the agitator was turned to a slow speed setting. About 711.58 liters of a solution of 0.6%, by weight, of a hydroxypropylmethyl cellulose suspending agent (METHOCEL brand from Dow Chemical Co.) was then added along with an additional 3785 liters of deionized water. To this medium was then charged about 4.54 kg. of a methyl tin mercaptide (MARK 1928 brand), about 2.27 kg. of epoxidized soybean oil (DRAPEX 6.8 brand), and about 2.72 kg. of an ethylenediaminetetra-acetic acid chelating agent (VERSENE brand). A t-butyl perneodecanoate initiator in mineral spirits solution (3.63 kg. of ESPEROX 33M brand) was then added and maximum vacuum was applied to the reactor. The reaction temperature was then set at 47.2° C., and the agitator was switched to high speed agitation. Vinyl chloride monomer (about 8845 kg.) was then charged into the reactor. The reaction was allowed to run for nine hours and twenty minutes at which time a 0.703 kg/cm$^2$ pressure drop occurred. At this point about 2.72 kg. of 2,6-di-tert-butyl-4-methyl phenol short stop agent (IONOL brand) was added to terminate the reaction.

A total of seventeen batches were run before the reactor needed cleaning as compared to nine batch runs that would be obtainable if the present invention were not used.

The foregoing illustrate certain preferred embodiments of the present invention but should not be construed in a limiting sense. The scope of protection that is sought is set forth in the claims which follow.

What is claimed:

1. A process for the suspension polymerization of vinyl chloride which comprises polymerizing vinyl chloride monomer in an aqueous suspension polymerization medium in the presence of an effective amount of a composition consisting essentially of an organotin mercaptide having the formula $R_mSn(SR')_{4-m}$, where m is an integer from 1 to 3, $R_m$ is a hydrocarbon group, and R' is selected from the group consisting of $R_m$ and —C(O)$R_m$, and an epoxidized vegetable oil, during a substantial portion of the reaction, to lessen the amount of polymer scale formation from the polymerization reaction.

2. A process as claimed in claim 1 wherein $R_m$ is an alkyl group having from 1 to 10 carbon atoms and R' is —C(O)$R_m$.

3. A process as claimed in either claim 1 or 2 wherein the mercaptide is present at from about 0.01% to about 0.5%, by weight of the monomer.

4. A process as claimed in either claim 1 or 3 wherein the mercaptide is present at from about 0.05% to about 0.25%, by weight of the monomer.

5. A process as claimed in either claim 1 or 3 wherein the organotin mercaptide is selected from the group consisting of dioctyl tin mercaptoacetate and dimethyl tin mercaptide and is present at from about 0.01% to about 0.5%, by weight of the monomer.

6. A process as claimed in claim 1 wherein the epoxidized vegetable oil is selected from the group consisting of the epoxidized derivatives of soybean oil, linseed oil, safflower oil, corn oil, cottonseed oil, rapeseed oil, and peanut oil.

7. A process as claimed in claim 6 wherein the vegetable oil is epoxidized soybean oil.

8. A process as claimed in either claim 1, 6 or 7 wherein the epoxidized vegetable oil is present at from about 0.01 to about 0.5%, by weight of the monomer.

9. A process as claimed in either claim 1, 6 or 7 wherein the epoxidized vegetable oil is present at from about 0.05% to about 0.25%, by weight of the monomer.

10. A process as claimed in either claim 1, 2, 6 or 7 wherein the suspension polymerization medium contains a hydrophobic, monomer soluble initiator.

* * * * *